March 26, 1946. J. J. TREFZ ET AL 2,397,323
METHOD FOR MAKING MOLDING MATERIAL
Filed Jan. 19, 1943
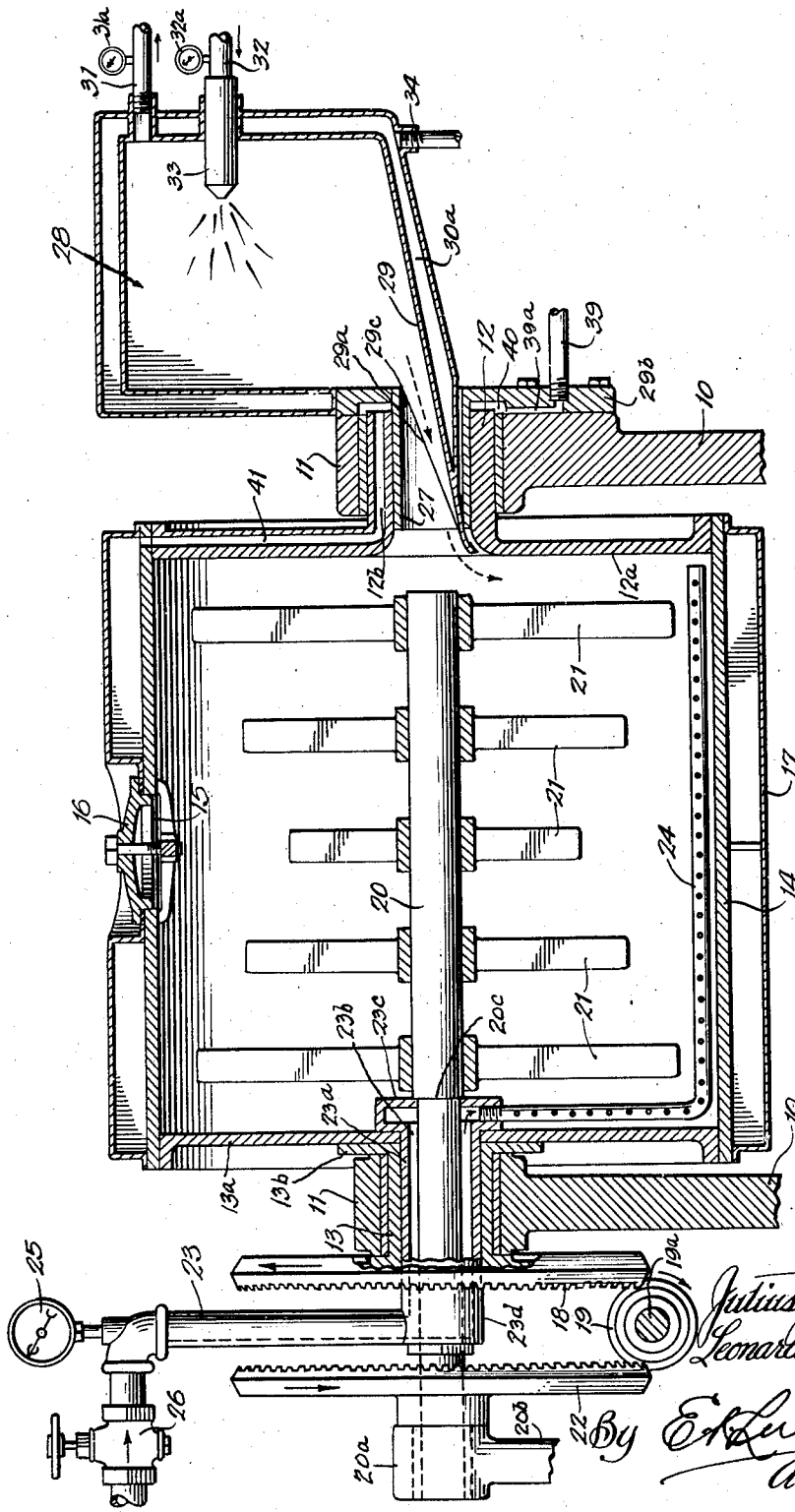
Inventors:
Julius J. Trefz and
Leonard S. Shoberg,
By E. K. Lundy
Attorney.

Patented Mar. 26, 1946

2,397,323

UNITED STATES PATENT OFFICE 2,397,323

METHOD FOR MAKING MOLDING MATERIAL

Julius J. Trefz, Evanston, and Leonard S. Shoberg, Glenview, Ill., assignors to Julius F. Trefz, Evanston, Ill., as trustee Application January 19, 1943, Serial No. 472,850

8 Claims. (Cl. 260—9)

This invention relates to a method or process for producing a powder or similar material adapted for various uses, and also to the improved material itself. Said invention has especial reference to the practice of the aforesaid method or process in an effective and economical manner for the production of the material in question on a highly commercial scale.

More particularly, this invention pertains to a special material, preferably in the form of a powder, that may be used in the manufacture of molded articles which are produced under the action of heat and pressure, whereby the resulting structure is tough and hard, and is characterized by its insolubility and infusibility as well as being able to withstand shock and severe usage. The material resulting from the practice of the method or process which is herein set forth is a phenolic condensation resinous powder, and it is comparatively inexpensive to manufacture due to the fact that the base or raw material which is supplied to the apparatus is a by-product or waste which inherently contains the elements which are required in carrying out the method or process. After the constituents have been extracted, the residual matter is utilized as the filler for the commercial product without requiring other filler ingredients to be added.

Briefly stated, this invention contemplates the extraction of certain of the self-contained elements which are inherent in oat-hulls, such for example as furfural, sugar, lignin, aldehyde, alcohol, and other constituents, by subjecting the oat-hulls to the infiltration of live steam under pressure whilst the mass of oat-hulls is being agitated in a digester chamber that is preferably closed to the atmosphere so that the reaction will take place under pressure to hasten the process. Under this treatment, these desired elements or constituents of the oat-hulls are liberated from the agitated mass and when thus freed are in suspension in a fog, mist, or vapor which arises, passes to, and is collected in a communicating chamber where the vapor is charged with phenol, or the like, preferably in solution. The reaction of the phenolic or like treatment causes the suspended elements to gravitate to the bottom or floor of the reaction chamber and thence be returned to the digester or agitator chamber. The elements or constituents acquired through condensation in the reaction chamber and returned to the digester chamber become re-mixed with the mass which has remained in the digester. This cycle is preferably continued until all the volatiles have been liberated and the desired constituents have been recovered from the oat-hulls. An alkaline or neutralizing agent such as soda, soda-ash, lime, and the like, is mixed with the recovered constituents to eradicate any acidity that may be present, after which the mass, which has been reduced to the form of a wet "mash" in the digester, is dumped from the apparatus for dehydration and grinding into the desired granular or comminuted consistency. The neutralization may be performed in the digester by depositing the alkalizing agent therein, or it may be performed in the reaction chamber whilst the phenol is being discharged into the fog, mist or the like.

Because of the inherent porosity of oat-hulls, it has been ascertained in practice that a mass of these oat-hulls constitutes an excellent base, for it has been found that they quite readily become thoroughly saturated with the liquid in the digester, and thus tend to considerably reduce the time element in the preparation of the molding material by this process.

The method or process of producing the molding powder contemplated herein is what may be termed a continuous or single-stage operation, and it is preferably performed in an apparatus such as disclosed in the accompanying drawing. This drawing shows a vertical longitudinal axial view through an apparatus which is to be understood as typical of a structure for the practice of this method or process.

The apparatus illustrated in the drawing, embodies vertical standards 10 provided with bearing bosses 11 at their upper portions that are horizontally bored to receive the hollow trunnions 12 and 13 projecting axially from the respective end plates 12a and 13a, which latter, together with a cylindrical wall 14, form a suitable drum. This drum provides a digester that is adapted to be rotated by devices later to be described, and said drum is provided with an opening 15 in its cylindrical wall 14 through which material may be charged or discharged by removal of a closure cap 16 that is clamped in position across said opening to seal the drum.

The drum may be of any desired dimensions proportionate to the service required of it, and it is provided with a jacket 17 that preferably envelops it, whereby the drum and the material therein may be heated by a suitable medium such as steam or otherwise. The rotation of the drum is accomplished by extending the end of its trunnion 13 beyond the bearing boss 11 and providing a relatively large gear wheel 18 on said extended end, which said gear wheel 18 is in mesh with a toothed pinion 19 that is secured to a drive-shaft 19a and actuated through any suitable source of power. As shown, the gear wheel 18 may be formed at the outer end of the trunnion 13, while the other end of said trunnion may be provided with an annular flange 13b that is suitably secured to the adjacent end of plate 13a of the drum.

A rotatable shaft 20 extends into the drum through but does not contact the inner surface of the hollow trunnion 13, and said shaft 20 is provided along its length inside the drum with a plurality of blades or paddles 21 that project radially from said shaft 20 and of proper length to agitate the material in the bottom of the drum. The outer end of shaft 20 is journaled in a horizontal bearing boss 20a at the upper end of a support or post 20b, and adjacent this bearing boss said shaft 20 has a large gear wheel 22 secured to it that is meshed with and is driven by the toothed pinion 19. The gear wheels 18 and 22 confront each other with their toothed portions facing and with the pinion 19 between them. This arrangement permits the drum and the paddles to rotate in opposed directions, and since the gear wheels 18—22 are preferably of the same dimensions the drum and paddles are moved at the same relative speed.

A suitable feed pipe 23, having a pressure gauge 25 and a control valve 26, leads from a suitable source of steam supply and it is adapted to discharge the steam under pressure into the drum. In order to admit the steam into the drum, the lower end of pipe 23 is provided with a laterally disposed hollow sleeve 23a having an inside diameter larger than the diameter of the shaft 20 to provide an annular or concentric passageway 23b between the shaft 20 and the sleeve 23a, which latter surrounds the shaft within the hollow trunnion 13. The sleeve 23a is stationary, whereas the trunnion revolves thereon, and the inner end of the sleeve discharges into a hollow enlargement or header 23c within the drum so that it surrounds the shaft 20 and abuts a shoulder 20c on the adjacent portion of said shaft 20.

An L-shaped discharge pipe 24, that is provided with a plurality of discharge or egress apertures, has its lateral or vertical radial arm secured in a pendent manner to and communicates with the header 23c, and the other or longer arm of pipe 24 is horizontal and extends along the lower portion of the drum in close proximity to the cylindrical wall 14. The said apertures are disposed in a manner so that the steam or other heated medium will be discharged or injected directly into the body or mass of material that is being agitated by the blades 21, thus permitting the steam to thoroughly infiltrate through the oat-hulls or other furfural-bearing material which is being subjected to a digesting treatment in the drum. Thus it will be seen that the drum, and its immediately associated parts, function in the manner of a digester.

The hollow trunnion 12 of the digester is in communication with a walled chamber 28 that has an inclined bottom 29 that slants downward toward the trunnion and provided with a chute 29a that enters the bore of the trunnion far enough to discharge directly into the digester. The chamber 28 is preferably enveloped by a jacket 30 that is spaced from the walls of said chamber whereby steam or other thermal medium, which may be supplied to the jacket through a feed pipe 34, is adapted to maintain the chamber at the desired temperature.

The chamber 28 is above the normal level of the material in the digester and cooperates therewith to function as a reaction chamber in the practice of this invention. Said reaction chamber is preferably mounted on the upper portion of the support or post 10 in any suitable manner. A portion of the reaction chamber walls embodies a relatively thick plate or casting 29b extending above and below the chute 29c and the opening in which the chute is disposed. This plate 29b has formed in it an annular passage 40 and has a cylindrical stub 27, which latter projects into the trunnion 12 to afford rigidity when the plate 29b is bolted or otherwise attached to the standard 10. A steam feed-pipe 39 is screwed into the lower portion of the plate 29b and discharges steam into the annular passage 40 through a conduit 39a. The trunnion 12 has a longitudinal bore 12b in its wall that communicates at its outer end with the annular passage 40, and at its inner end communicates with a radially disposed bore 41 in the end wall 12a of the drum, which said radial bore 41 discharges into the drum-enveloping jacket 17. By means of the construction and arrangement just described, the digester chamber or drum may be heated and maintained at the desired temperature during the operation of the apparatus in practicing the invention contemplated herein.

An outlet 31 leads out of the upper portion of the reaction chamber 28, and an adjustable pressure control-valve or other suitable device 31a is interposed in said outlet whereby the desired pressure may be maintained within the apparatus during the functioning of the latter.

The vapors, fog, mist and the like that are given off and which issue the material being agitated in the digester drum 14, will carry in suspension the desirable constituents which are self-contained or inherent in the oat-hulls or other material that is placed in the digester at the start of the method or process, and said vapors, etc., readily pass into the reaction chamber 28 through the hollow trunnion 12 and the chute 29a. Within the reaction chamber 28, the vapors are treated with a reacting agent which is in solution and which is preferably sprayed into the central portion of the reaction chamber through the medium of an atomizer 33 to cause condensation therein. The atomizer is located below the plane of the outlet 31, the solution being fed to the atomizer by a supply pipe 32 from a suitable source under pressure and is controlled by a regulator 32a.

In practicing the method or process contemplated herein, it is preferred to form the same in the following manner when oat-hulls, rice-hulls, and similar furfural-bearing substances are used for the production of the molding powder:

The oat-hull, and the like, are placed in the digester 14 and are moistened with sulphuric acid in solution, after which the closure 18 is clamped into position across the opening 15. The rotation of the drum and paddles are started, and through the medium of the gearing said elements are moved in opposite directions at approximately the same speed. The agitated furfural-bearing substances are being continuously infiltrated with steam, preferably under pressure, discharged through perforated pipe 24 to thoroughly saturate the hulls and to raise the temperature thereof to a degree sufficient to liberate the constituents inherent in said hulls.

These constituents, which leave the agitated hot mass in suspension in a vapor, are furfural, sugar, lignin, aldehyde, and probably certain volatiles, all of which have been released from the hulls through the action of the steam, the pressure and the sulphuric solution. The liberated constituents in the vapor pass from the digester through the hollow trunnion 12 and enter the reaction chamber 28, where the temperature is preferably slightly below the temperature in the digester. Within the reaction chamber, phenol and the like is sprayed by atomizer 33 into the vapor-borne constituents thus causing the latter to condense and fall to the inclined floor 29 upon which they will pass out of the reaction chamber and be returned, on chute 29a, to the digester chamber where these constituents are commingled with the residual mass which is continuously undergoing agitation in the presence of steam and pressure.

While the vapor-borne constituents are arising in the digester or agitator chamber, any excessive pressure is relieved through the outlet 31 and its regulator 31a, thereby permitting the vapor to pass into the reaction chamber. During the spraying of the vapor in the reaction chamber, a neutralizing agent, such as soda, soda-ash, or lime-water, is preferably injected into the reaction chamber and into the vapor therein. As a result of the immediate reaction obtained by the sprayed phenol and neutralizing agent, and the constituents of the hulls, there is a phenolic resin created, which, together with the neutralizing agent, returns to the digester where it is mixed with the residual of the hulls by mechanical agitation. The performance of this cycle or stage is continued until all of the desired constituents have been extracted from the oat-hulls and have become mixed with the residue in the digester, so that no filler need be added to the mass since the residual material provides the required filler for the molding powder. The water and steam is drawn off the digester chamber in any suitable manner, and the phenolic resin and filler substance is removed and dehydrated, after which it is ground or milled to the desired size and is ready for immediate use without addition of extraneous material.

For quantity production of the molding powder, 3000 pounds of oat-hulls or other furfural-bearing material may be mixed with a solution of 750 pounds of water containing 56 pounds of sulphuric acid (95%). The steam in the jacket 17 of the digester 14 should be at a temperature of from 300° F. to 400° F., and the steam pressure which is introduced into the mass of material in said digester should be approximately 270 pounds to 280 pounds per square inch, which will tend to raise the temperature of the mass of material being digested to approximately 400° F. to 425° F.

A molding material of the character contemplated herein, may be obtained by mixing equal proportions of phenol and the furfural which has been obtained by a digestive method of production from oat-hulls, and the like. These ingredients are placed in a digester with a quantity of a neutralized commercial residue of the hulls which has been left from a digestive process, and this mixture is then heated by steam and pressure, after which the mass is cooled, dried, and milled.

Also, the residue of hulls and the like may be neutralized with an alkaline agent and then ground to a suitable powder, and the latter then mixed, either with or without heat, in a mechanical manner with the commercial product known as "phenol-furfural resin" to form the molding material.

While the invention contemplated herein has been described in detail in its present preferred form or embodiment, it will be obvious to those skilled in the art, after understanding said invention, that various changes, modifications and the like may be made therein without departing from the spirit or scope thereof. The aim of the appended claims is to cover all such changes, modifications and equivalents.

What is claimed is:

1. A method of producing a resinous molding material comprising infiltrating steam into a mass of natural material from which furfural may be extracted during agitation of the mass in a digester to liberate a vapor containing furfural and other constituents in suspension; transferring the said vapor to a closed reaction chamber communicating with the digester; reacting upon the vapor and suspended constituents by an injection of vaporized phenol to produce a phenol-furfural reaction product which gravitates to the floor of the reaction chamber; returning the gravitated phenol-furfural reaction product to the digester; and re-mixing said phenol-furfural reaction product with the mass remaining in the digester and with a neutralizing agent in sufficient amount as to neutralize said mass.

2. A method of producing a resinous molding material comprising infiltrating steam into a mass of acidified oat-hulls during agitation of the mass in a closed digester to liberate furfural and other constituents in a vapor; transferring the vapor-borne constituents to a closed reaction chamber communicating with the digester; reacting upon the vapor-borne constituents by injecting phenol vapor thereinto, thereby precipitating a synthetic resin of the phenol-furfural type; transferring said resin to the digester and there impregnating the residual oat-hulls therewith; and thereafter neutralizing the mass thereby formed with an alkali.

3. The method of making a synthetic resin which comprises digesting a natural furfural-yielding material with steam in the presence of acid, thereby liberating furfural and other volatile substances in the vapor phase, and reacting upon said furfural and other vapors with phenol vapor in an alkaline environment.

4. The method of making a resinous molding material, which comprises digesting vegetable furfural-yielding material with steam under agitation and pressure in the presence of added mineral acid, thereby liberating volatile compounds comprising furfural, condensing said volatile compounds from the vapor phase with a phenolic vapor, thereby forming a fluid resin, and impregnating the digested vegetable material with said resin and a neutralizing agent.

5. The method of making a synthetic resin, which comprises digesting natural furfural-yielding material with steam under pressure in the presence of added acid, thereby liberating volatile substances including furfural, and concurrently, reacting, in an alkaline environment, in the vapor phase upon said substances, which have been previously liberated, with phenol vapor, thereby condensing a resin liquid under the conditions of reaction.

6. The method of making a resinous molding material, which comprises agitating natural furfural-yielding material with acid, passing steam therethrough under pressure, thereby entraining substances including furfural released from said natural material, and condensing said entrained substances by reaction with a phenolic vapor in the presence of a basic substance.

7. The method of making a resinous molding material, which comprises digesting acidified oat-hulls with steam under agitation and pressure, thereby liberating volatile compounds comprising furfural, condensing said volatile compounds from the vapor phase with a phenolic vapor, thereby forming a fluid resin, impregnating the residual oat-hull material with said resin, and neutralizing said oat-hull material with a basic substance.

8. The method of making a resinous molding material, which comprises agitating oat-hulls with acid, passing steam therethrough under pressure, thereby entraining substances including furfural released from said oat-hulls, and condensing said entrained substances by reaction with a phenolic vapor in the presence of an alkaline catalyst.

JULIUS J. TREFZ.
LEONARD S. SHOBERG.